M. FUJII.
BINOCULARS.
APPLICATION FILED OCT. 12, 1917.

1,358,721.

Patented Nov. 16, 1920.

Witnesses.
Den Kido
Eishiro Abe

Inventor.
Mitsuzo Fujii.

UNITED STATES PATENT OFFICE.

MITSUZO FUJII, OF TOKYO, JAPAN.

BINOCULARS.

1,358,721.     Specification of Letters Patent.     Patented Nov. 16, 1920.

Application filed October 12, 1917. Serial No. 196,134.

*To all whom it may concern:*

Be it known that I, MITSUZO FUJII, a subject of the Empire of Japan, residing at 2 Toyookamachi, Mita, Shiba-ku, Tokyo, Japan, have invented certain new and useful Improvements in Binoculars, of which the following is a specification.

My invention relates to binoculars which are provided with an adjusting device for the objective lens, and in accordance with the invention the objective with its mount is inserted in a supporting tube provided at the front end of the binocular body, so that a proper clearance is left between said mount and the inner periphery of the supporting tube, the mount being by means of a set of screws adjustably sustained in said clearance space, and a flanged portion formed at its front end being engaged with an annular groove formed in the inner periphery of the supporting tube, and by a screw-threaded ring applied at the front end of said tube, so that when the objective with its mount is adjusted by the screws, it is guided by its flanged portion, and thus the objective is kept at right angles to the central line of the binocular body, the mount being secured in the position as adjusted.

The object of this invention is, by a simple construction, to make the rays coming from the eye-pieces through the right and left objectives, parallel each other.

The accompanying drawings show an example of this invention, in which:—

Figure 1:
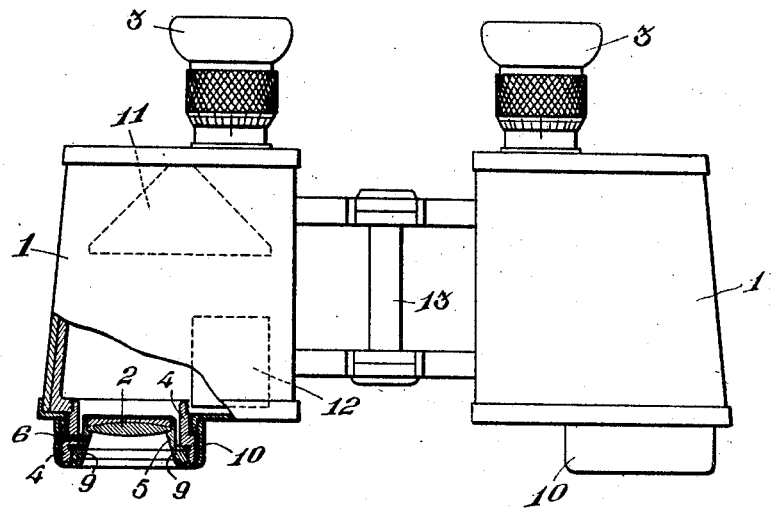
Figure 1 is an elevation, partly in section, of my adjusting device applied to a prismatic binocular of Porros system.
Figure 4:
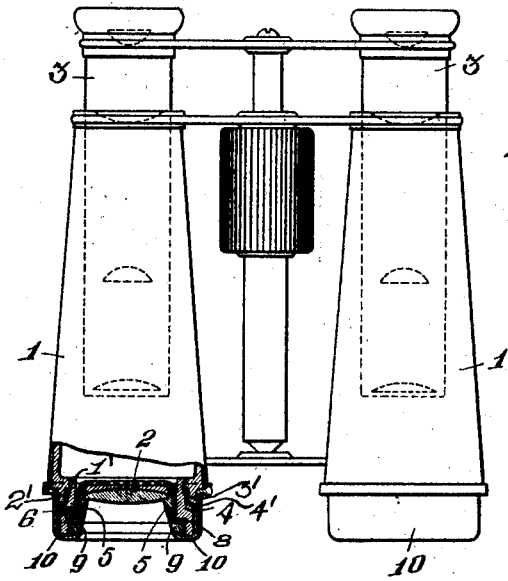
Fig. 4 is an elevation, partly in section, of the adjusting device applied to a common binocular.
Figure 2:
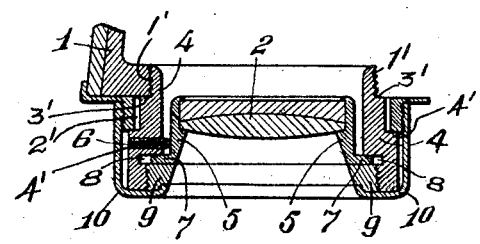
Figs. 2 and 3 are detail sectional elevation and sectional plan respectively of the adjusting device.
Figure 3:
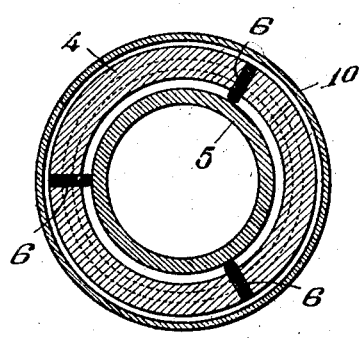

In the drawings, 1 are the binocular body portions; 2 the objective; 3 the eye-piece; and 11 and 12 are prisms arranged in the body; 13 being the hinge connecting the right and left body portions.

According to the present invention, a binocular body portion is provided with a threaded aperture 1′ and with an exteriorly threaded tubular extension 2′. A supporting tube 4 is now employed and has its outer surface reduced at the two points to provide shoulders 3′ and 4′, the tube being arranged within the extension and threaded into the aperture 1′ in such manner that the shoulder 3′ embraces the body portion while the shoulder 4′ abuts the outer edge of the extension 2′. The objective 2 with its mount 5 is inserted within the tube 4 leaving proper clearance between the mount and the inner periphery tube and is supported by a suitable number of adjusting screws 6 threaded into the wall of the tube 4, so that the position of the mount 5 may be freely adjustable in the tube by screwing and unscrewing the adjusting screws. A flanged portion 7 formed at the front end of the mount 5 is engaged with an annular groove or shoulder 8 formed in the supporting tube. That portion of the tube between the groove and shoulder 8 on the front end is reduced and threaded interiorly to receive an exteriorly threaded screw ring and thus when the mount 5 is adjusted by the screws 6, no tilting or inclination thereof is possible since the screw ring clamps the flange against the shoulder and accordingly the objective is kept at right angles to the central line of the binocular body. A tubular cover or retainer 10 is now employed, the outer flanged portion thereof embracing the outer edge of the tube and being seated within the ring 9 while the inner surface of the inner end of the cover or retainer is threaded for engagement with the exteriorly threaded extension 2′, the object of the cover or retainer being to lock the tube against the extension and the ring within the tube so as to maintain the parts in a properly adjusted position.

In binoculars, there are three methods of adjustment to make the exit rays parallel: first, the system in which the objective or eye-piece is moved at right angles to the direction of the rays; second, the system in which the length of the arm of the hinge is regulated; third, the system in which the position of prisms is altered. The present invention relates to the first system, and the adjusting device is very simple in construction, and the adjustment is easily made by removing the cover 10, without removing any other parts. As the objective with its mount is sustained by a set of screws with a suitable clearance between it and the inner periphery of the supporting tube, there is no danger of distortions by wrong attachment, variation of temperature, or shocks, etc., and of loss of definition as often occurs in ordinary binoculars. Furthermore, as the objective may be easily taken away by removing the screw ring and adjusting screws, the cleaning of the lens may be conveniently attended to.

I claim:—

The combination with a binocular body portion having a threaded aperture and provided with an exteriorly threaded tubular extension, of a supporting tube having its outer surface provided with two shoulders and threaded in its inner portion for engagement with the aperture so that the shoulder will abut the body portion and not the extension, the inner portion of the tube being provided with an annular groove and being further reduced and threaded interiorly between the groove and its outer edge, an objective and mount of less diameter than the diameter of the tube within the tube, an annular flange at the front end of the mount, adjusting screws arranged through the walls of the tube for engaging the outer surface of the mount, an exteriorly threaded ring engaged with the interiorly threaded portion of the tube for clamping the flange in the groove subsequent to the adjustment of the screws, a retaining cover in threaded engagement with the extension and having a flange embracing the outer edge of the tube and seated in the ring for locking the tube to the body and the ring within the tube.

In testimony whereof I affix my signature in presence of two witnesses.

MITSUZO FUJII.

Witnesses:
 DEN KIDO,
 EISHIRO ABE.